(12) United States Patent
Miyamoto

(10) Patent No.: US 6,437,256 B1
(45) Date of Patent: Aug. 20, 2002

(54) COMBINATION WEIGHING APPARATUS

(75) Inventor: Hisakazu Miyamoto, Shiga (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 09/626,964

(22) Filed: Jul. 27, 2000

(30) Foreign Application Priority Data

Aug. 6, 1999 (JP) ........................................... 11-224624

(51) Int. Cl.$^7$ ........................................... G01G 19/387
(52) U.S. Cl. ................................................... 177/25.18
(58) Field of Search ..................................... 177/25.18

(56) References Cited

U.S. PATENT DOCUMENTS

| | | | | |
|---|---|---|---|---|
| 4,821,820 A | * | 4/1989 | Edwards et al. | 177/25.18 |
| 4,901,807 A | * | 2/1990 | Muskat et al. | 177/25.18 |
| 5,340,949 A | * | 8/1994 | Fujimura et al. | 177/25.18 |
| 5,767,453 A | | 6/1998 | Wakou et al. | |
| 5,889,235 A | * | 3/1999 | Kawanishi | 177/25.18 |
| 5,962,816 A | * | 10/1999 | Zeyer | 177/25.18 |

FOREIGN PATENT DOCUMENTS

| | | | |
|---|---|---|---|
| DE | 4415106 A1 | 11/1995 | |
| EP | 0614814 A1 | 8/1992 | |
| EP | 0576223 | * 12/1993 | 177/25.18 |
| EP | 0727648 A1 | 8/1996 | |
| JP | 8-219859 | 8/1996 | |
| JP | 10-38666 | 2/1998 | |
| JP | 10-59524 | 3/1998 | |
| JP | 11-2560 | 1/1999 | |

* cited by examiner

*Primary Examiner*—Randy W. Gibson
(74) *Attorney, Agent, or Firm*—Staas & Halsey LLP

(57) ABSTRACT

A combination weighing apparatus 1 comprising a plurality of hoppers 4, 5 and 6 arranged in horizontal rows, a conveyor 7 provided below the plurality of hoppers for transporting articles discharged from the plurality of hoppers, respectively, to a predetermined collection position, and a controller 20 for controlling a combination weighing operation for selecting a combination of hoppers 5 and 6 so that a combination weight value obtained by combining some of weight values of the articles supplied to said plurality of hoppers 5 and 6 falls within a predetermined combination tolerance and discharging the articles from the hoppers in the selected combination 5 and 6. When a plurality of the combination weighing apparatuses are provided in order for the conveyors 7 of the respective apparatuses transport articles to a common collection position, weighing apparatuses 1 can cooperate with each other so that the plurality of the combination weighing apparatuses conduct the combination weighing operation with weight values obtained in all the combination weighing apparatuses. Thus, it is possible to use the combination weighing apparatus solely for one operator and to couple a plurality of combination weighing apparatuses to be used for a plurality of operators.

16 Claims, 13 Drawing Sheets

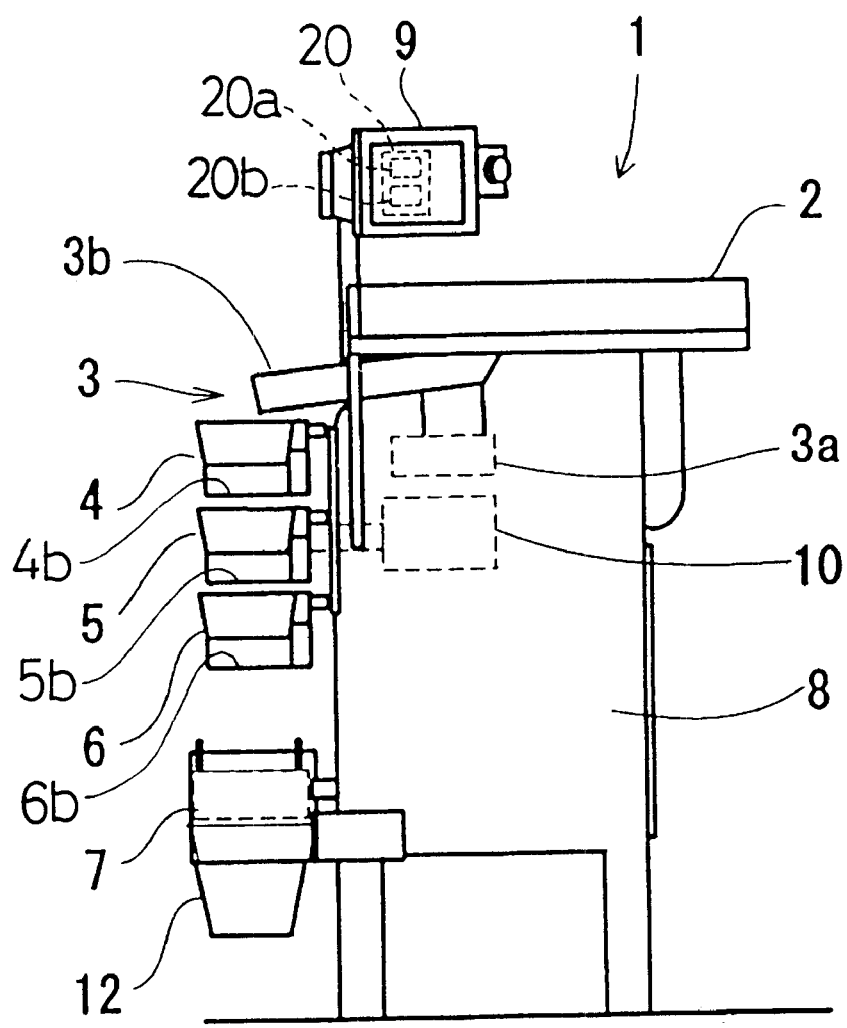

COMBINATION WEIGHING APPARATUS

BACKGROUND OF THE INVENTION

1. Field of the Invention

The present invention is related to a combination weighing apparatus for weighing articles supplied to a plurality of weighing hoppers, respectively, combining the weights of the articles thus supplied to thereby obtain a combination in which the combined weights fall within a predetermined combination tolerance, discharging and collecting the articles from the hoppers in the combination, thereby obtaining articles of a predetermined weight.

2. Description of the Prior Art

As an apparatus for weighing cooked foods, cooked beans, foods boiled down in soy or other sticky articles (to be referred to as "articles" hereinafter) by a predetermined weight, there is known a semiautomatic combination weighing apparatus 1 as shown in FIGS. 14 and 15. This apparatus comprises an upper-stage table 2, a plurality of lower-stage supply feeders 3 into which articles are supplied from a plurality of outlets of the table 2, a plurality of pool hoppers 4 provided below the tip ends of the supply feeders 3 and temporarily storing the articles supplied from the supply feeders 3, respectively, a plurality of weighing hoppers 5 provided below the pool hoppers 4 and receiving and weighing the articles discharged from the pool hoppers 4, respectively, a plurality of booster hoppers 6 provided below the weighing hoppers 5 and temporarily storing the articles discharged from the weighing hoppers 5 to allow them to be combined, respectively, and a lowest-stage conveyor 7 collecting the articles discharged from these booster hoppers 6 in one portion.

In the semiautomatic weighing apparatus of this type, many articles are stocked on the table 2. An operator or operators need to input the articles into the outlets of the table 2 which outlets are connected to the respective supply feeders 3, while supplying the articles. Due to this, if the number of operators is one, a compact size apparatus having five groups of vertically three stages of hoppers arranged in horizontal rows is employed as shown in FIG. 14. If the number of operators is two, a high speed, high precision apparatus having ten groups of vertically three stages of hoppers arranged in horizontal rows is employed as shown in FIG. 15 (U.S. Pat. No. 5,767,453).

Meanwhile, the weighing apparatus for one operator is inferior to the weighing apparatus for two operators in capability and precision. Namely, as for capability, the maximum weighing processing capability of the weighing apparatus for one operator is 25 times/minute, whereas that of the weighing apparatus for two operators is 60 times/minute. As for precision which varies according to the features of articles, operating conditions and the like, the former apparatus has error of about 2 g to 6 g for a target weight value 100 g, whereas the latter apparatus has error of about 1 to 2 g.

Generally, it is convenient for a user involved in producing various types of articles in small quantity to purchase a plurality of weighing apparatuses for one operator. However, if the plural apparatuses for one operator are used in busy to weigh articles of the same type, the advantages of high speed and high precision as seen in the apparatus for two operators cannot be disadvantageously obtained.

SUMMARY OF THE INVENTION

The present invention has been made in view of the above-stated problems. It is, therefore, an object of the present invention to provide a weighing apparatus suited for weighing purposes by electrically coupling a plurality of apparatuses for one operator which can be used individually to provide a new combination weighing apparatus which can be used as an apparatus for a plurality of operators.

A combination weighing apparatus according to the present invention comprises a plurality of hoppers arranged in horizontal rows, a conveyor provided below the plurality of hoppers for transporting articles discharged from the plurality of hoppers, respectively, to a predetermined collection position, and a controller for controlling a combination weighing operation for selecting a combination of hoppers so that a combination weight value obtained by combining some of weight values of the articles supplied to the plurality of hoppers falls within a predetermined combination tolerance, and discharging the articles from the hoppers in the selected combination. This combination weighing apparatus is featured in that when a plurality of the combination weighing apparatuses are provided and discharge ends of the conveyors of the respective combination weighing apparatuses are disposed to discharge the articles at the same collection position, the controller is adapted to cooperate with the controller of the other combination weighing apparatuses so that the plurality of combination weighing apparatuses conduct the combination weighing operation with weight values obtained in all the combination weighing apparatuses.

Thus, normally, a plurality of apparatuses can be used separately. When busy, these plural apparatuses can be coupled to one another to be used for a plurality of operators. It is, therefore, possible to conduct weighing operation according to weighing purposes intended to provide high precision and high capability.

In a preferred embodiment of the present invention, the conveyor is constructed to be able to select a transport direction between a forward transport direction and a backward transport direction.

Thus, it is possible to provide variety of layouts for physically coupling and separating the plurality of apparatuses.

In a preferred embodiment of the present invention, a return regulating member for detaching the articles from the conveyor at the collection position, is provided to be associated with the conveyor.

In a preferred embodiment of the present invention, the apparatus is adapted to be disposed together with the other apparatus in a side-by-side fashion.

In a preferred embodiment of the present invention, the apparatus is adapted to be disposed together with the other apparatus to confront each other.

BRIEF DESCRIPTION OF THE DRAWINGS

The present invention will become more clearly understood from the following description of preferred embodiments thereof, when in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 4 is a side view of the combination weighing apparatus according to the present invention;

DETAILED DESCRIPTION OF THE EMBODIMENTS

Figure 1:
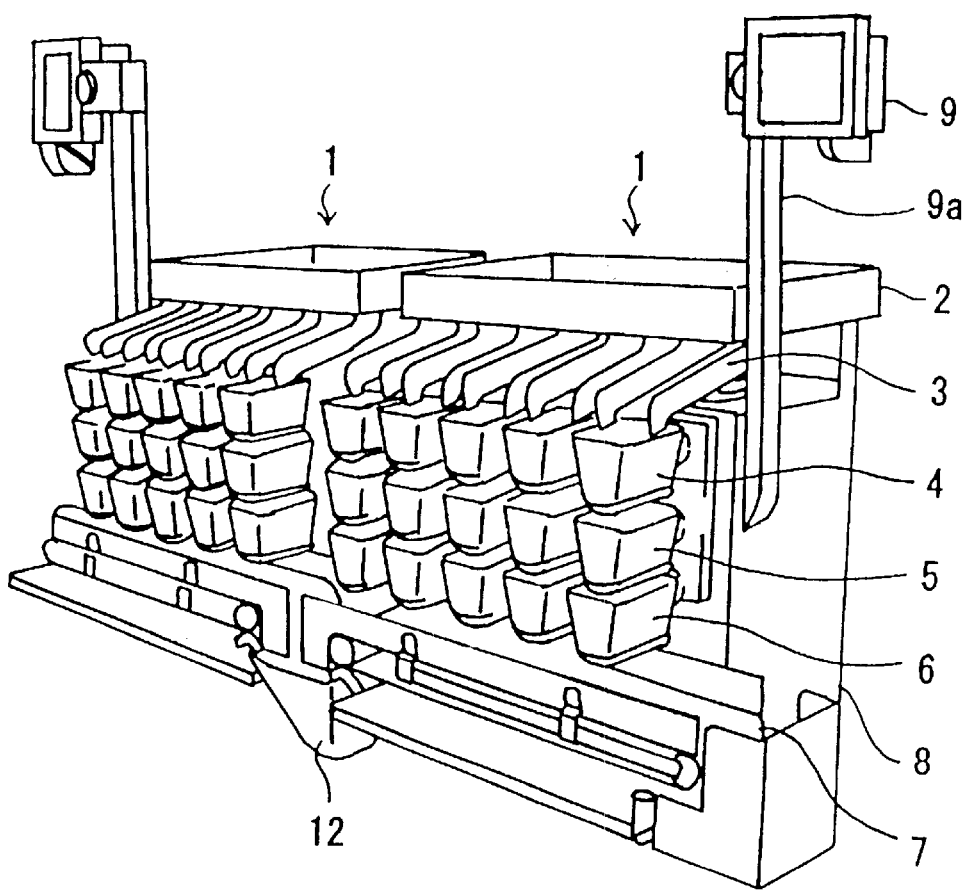
FIG. 1 is a perspective view of the combination weighing apparatuses according to a first embodiment of the present invention.
Figure 2:
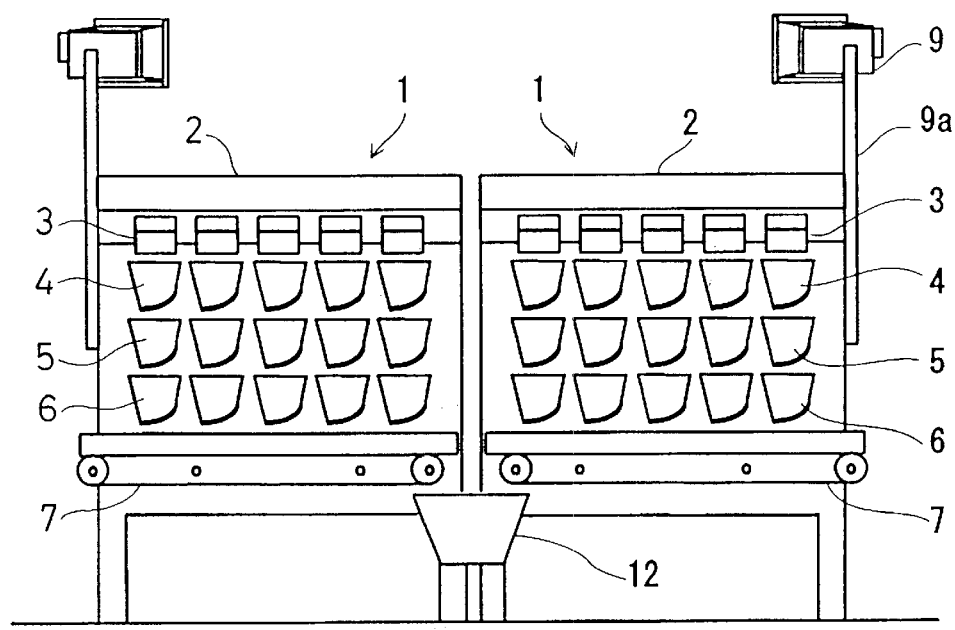
FIG. 2 is a front view of the combination weighing apparatuses according to the first embodiment.
Figure 3:
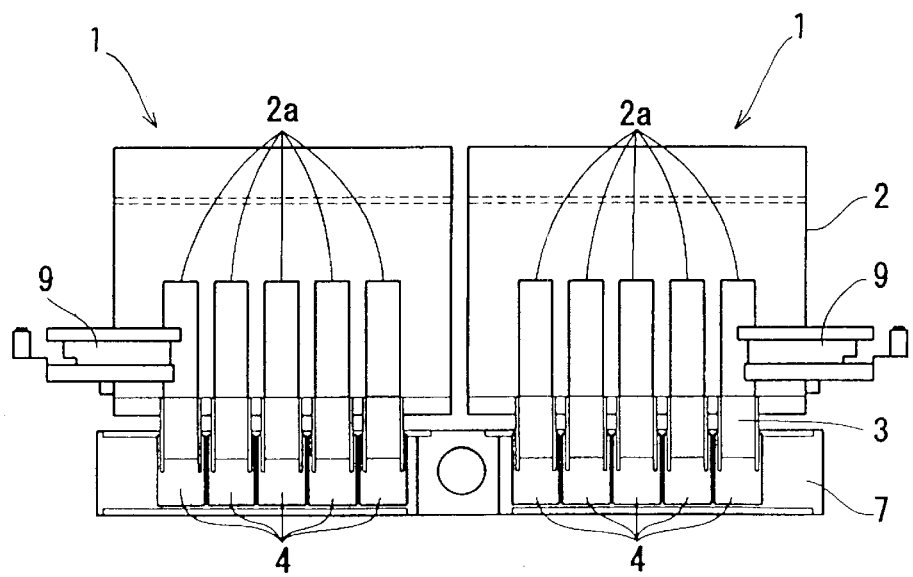
FIG. 3 is a plan view of the combination weighing apparatuses according to the first embodiment.

FIGS. 1 to 4 show a combination weighing apparatus according to the first embodiment of the present invention. FIGS. 1 to 3 show a state in which two combination weighing apparatuses 1 are disposed in a side-by-side fashion or aligned horizontally to allow the two apparatuses to conduct one combination weighing operation with weight values obtained in two apparatuses. The right-side apparatus 1 and the left-side apparatus 1 are the same in construction. Each apparatus comprises an upper-stage table 2, a plurality of supply feeders 3 provided below the table 2, a plurality of pool hoppers 4 provided below the tip ends of the supply feeders 3 and temporarily storing articles supplied from the feeders 3, respectively, a plurality of weighing hoppers 5 provided below the pool hoppers 4 and receiving and weighing the articles discharged from the pool hoppers 4, respectively, a plurality of booster hoppers 6 provided below the weighing hoppers 5 and temporarily storing articles discharged from the weighing hoppers 5 to allow them to be combined, and a lowest-stage conveyor collecting the articles discharged from these booster hoppers 6 in one portion. These elements are attached to a driving box 8 including therein a motor for driving the elements and the like. A support 9a is attached to either the right or left side end portion of the driving box 8. A control box 9 is supported on the upper portion of the support 9a.

As shown in FIG. 3, the table 2 is formed into a rectangular tray capable of storing articles. A plurality of outlets 2a are equidistantly formed on the front portion of the base of the table 2 so as to input the articles on the table 2 into the respective supply feeders 3. Below the outlets 2a, a plurality of supply feeders 3 corresponding to the respective outlets 2a are provided to be arranged in horizontal row.

As shown in FIG. 4, each of the supply feeders 3 is provided with an electromagnetic vibrator 3a and an inclined trough 3b having a rear end base supported by the vibration device 3a. The inclined trough 3b is inclined so that the tip end side of the trough 3b is lower than the rear end base. The trough 3b conveys the articles inputted from the outlet 2a into the rear end portion of the inclined trough 3b while vibrating the articles.

Figure 5A:
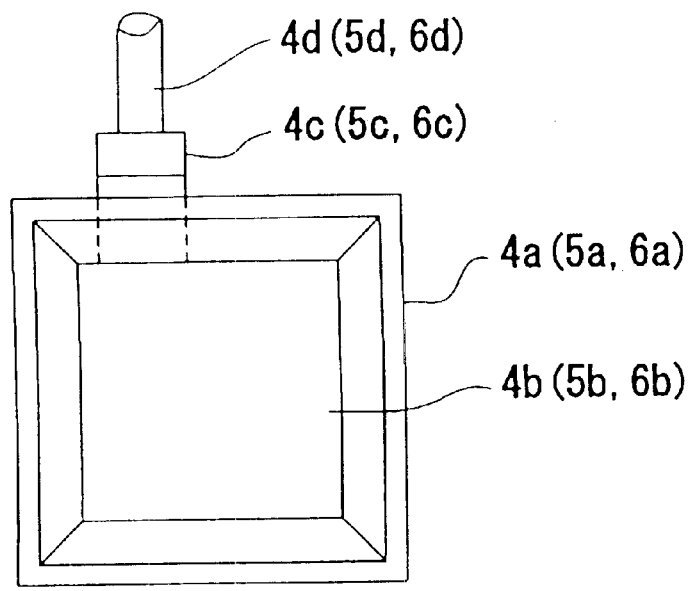
FIG. 5A is a plane view of a pool hopper.
Figure 5B:
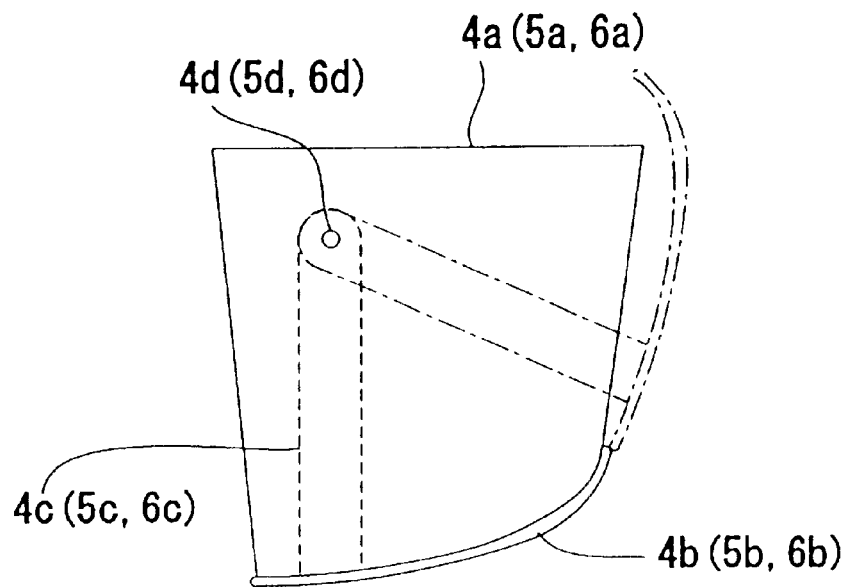
FIG. 5B is a front view of the pool hopper.

Since the pool hoppers 4, the weighing hoppers 5 and the booster hoppers 6 are in the same construction, the construction of these hoppers will be described while taking a pool hopper 4 shown in FIGS. 5A and 5B as an example. The pool hopper 4 (weighing hopper 5, booster hopper 6) comprises a cylindrical hopper body 4a (5a, 6a) made of a synthetic resin and having an upper opening portion and a lower opening portion narrower than the upper opening portion, and a shutter 4b (5b, 6b) disposed on the hopper body for moving between an opened position and a closed position. In the hopper, the shutter 4b (5b, 6n) is closed to thereby store articles in the hopper main body and the shutter 4b (5b, 6b) is opened to thereby discharge the stored articles downward. The shutter 4b (5b, 6b) is formed into a circular arc shape, in front view, so as to be matched with the shape of the lower opening portion of the hopper main body 4a (5a, 6a), and attached to a rotary arm 4c (5c, 6c) pivotal about the center of the circular arc. The pivotal shaft 4d (5d, 6d) of the rotary arm 4c (5c, 6c) is coupled to the output shaft of the motor included in the driving box 8 (FIG. 4). Thus, if the motor is rotated and the rotary arm 4c (5c, 6c) is rotated about the pivotal shaft 4d (5d, 6d), the shutter 4b (5b, 6b) occupies closed position and opened position.

Referring back to FIG. 4, the hopper body of each of the pool hopper 4 and the booster hopper 6 is fixed to the front surface of the driving box 8 and thereby supported, and motors for driving the shutters 4b and 6b are fixedly provided in the driving boxes 8. As for the weighing hopper 5, by contrast, a motor for driving the hopper body 5a and the shutter 5b is supported by a load cell 10 in the driving box 8. Therefore, the weights of the hopper body 5a (FIG. 5B), the shutter 5b, the rotary arm 5c (FIG. 5B), the motor and the like are constantly applied to the load cell 10. The load resulting from the subtraction of the constant load from the entire load applied to the load cell 10, is detected as the weight of the articles in the weighing hopper 5.

An endless belt moving in one direction of the conveyor 7 receives the articles discharged from the respective booster hoppers and the conveyor 7 transports the articles to a collection position common to the right and left apparatuses. The rotation of a motor for driving the endless belt is switchable between forward rotation and backward rotation. By changing the rotating direction of the motor, the transport direction of the conveyor 7 can be changed. That is, the conveyor 7 is constructed to be capable of selecting transport direction between the forward direction and the backward direction. As shown in FIG. 2, in this embodiment, the conveyor 7 of the right-side apparatus 1 transports articles leftward and the conveyor 7 of the left-side apparatus 1 transports articles rightward.

Figure 6:
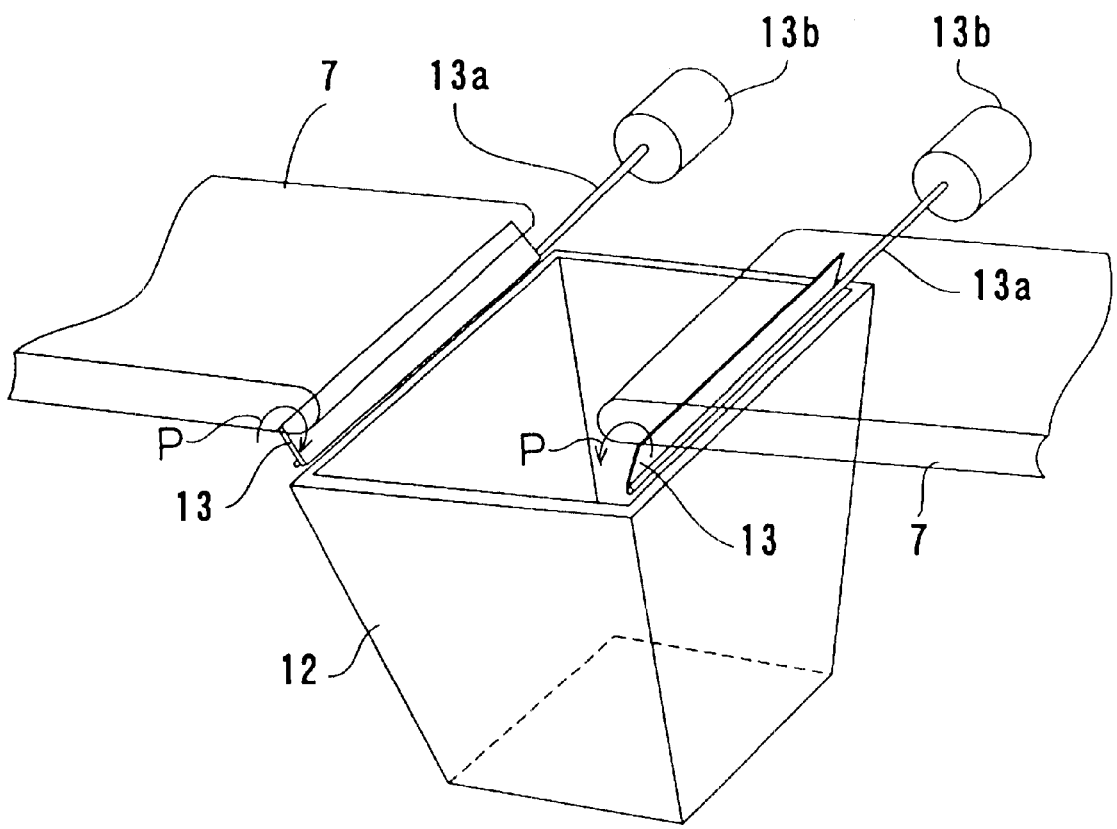
FIG. 6 is a perspective view of a discharge chute and a return regulating member.

As shown in FIG. 6, a funnel-like discharge chute 12 for introducing articles falling from the end portions of the conveyors 7, 7 without scattering the articles around is provided at the collection position. Also, return regulating plates 13, 13 are provided between the right and left conveyors 7, 7 and the discharge chute 12, respectively, and extending to the width direction of the conveyors 7. The return regulating plate 13 is a rectangular thin plate having a length almost equal to the belt width of the conveyor 7 and fixedly attached to a rotary shaft 13a protruding forward from the driving box 8 (FIG. 4). Also, the rotary shaft 13a is connected to a motor 13b provided within the driving box 8 (FIG. 4). In a waiting position, one side edge of the return regulating plate 13 contacts with the lower surface of the return side (lower side) of the belt. Then, the side edge of the plate 13 rotates toward the inside the discharge chute 12 as indicated by an arrow P by a predetermined angle, and returns to its original position by driving the motor 13b. This operation is carried out right after the articles on the conveyors 7 are discharged into the discharge chute 12. Consequently, the articles, which have adhered to the return side (lower side) of the belt, are scraped away at the collection position and dropped into the discharge chute 12.

Figure 12:
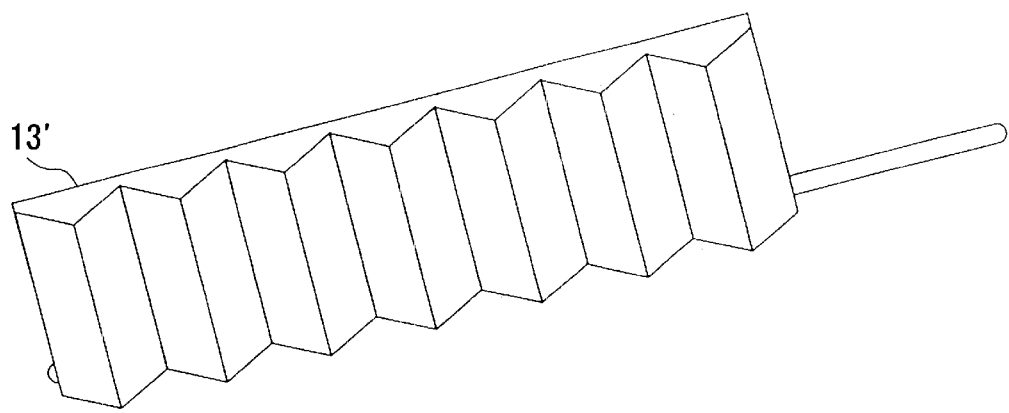
FIG. 12 is a perspective view of a modification of the return regulating member.
Figure 13:
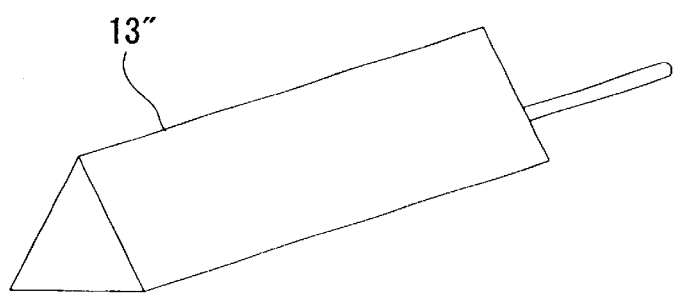
FIG. 13 is a perspective view of another modification of the return regulating member.
Figure 14:
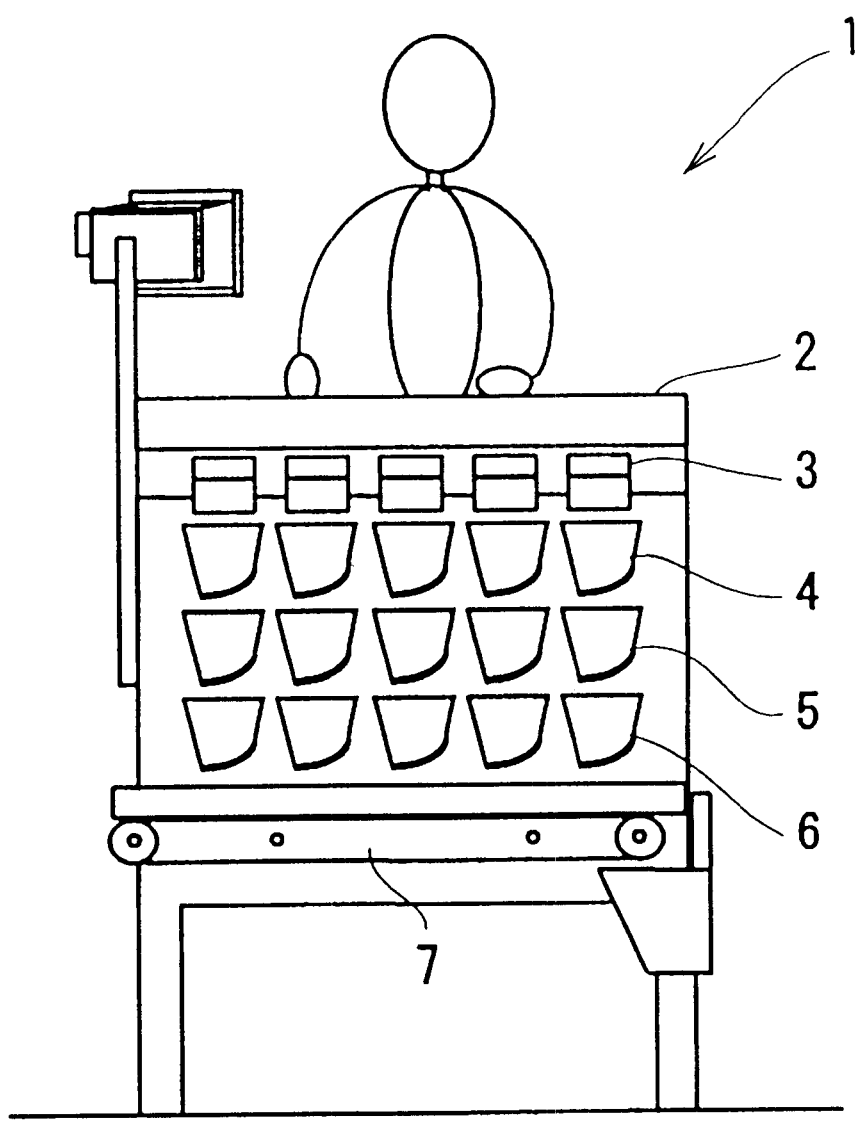
FIG. 14 is a front view of a conventional combination weighing apparatus for one operator.
Figure 15:
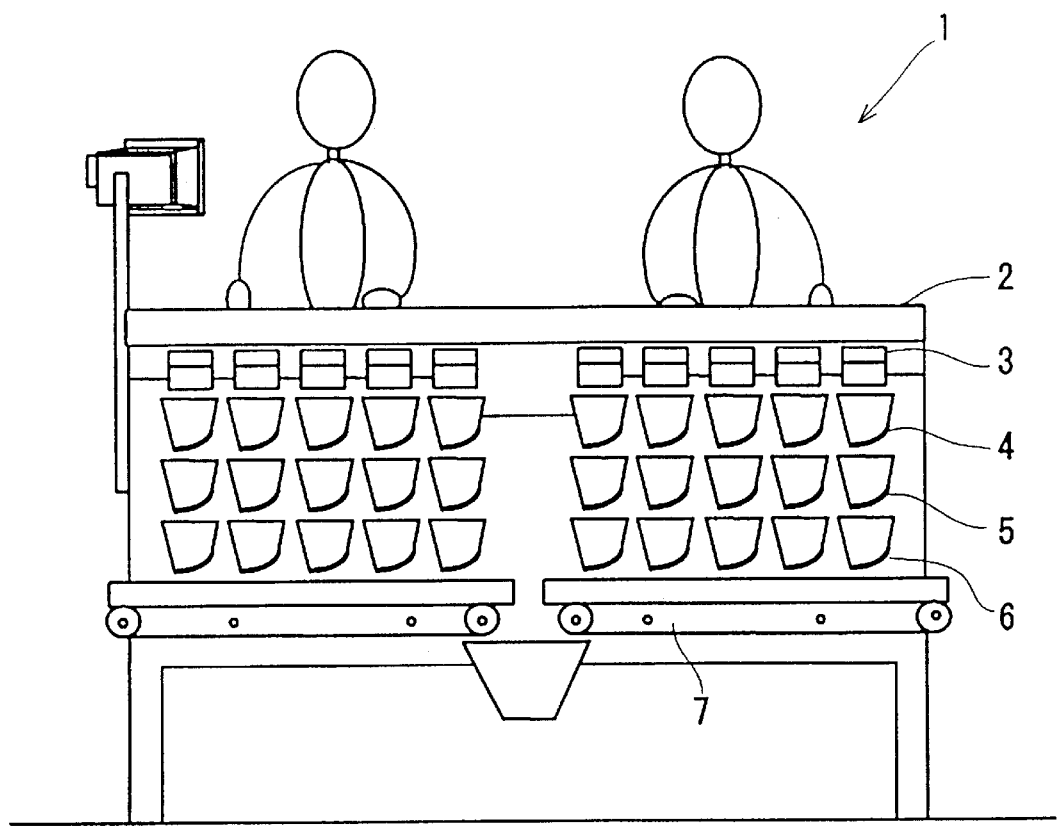
FIG. 15 is a front view of a conventional combination weighing apparatus for two operators.

As shown in FIG. 12, the surface of a return regulating member 13' may be indented to make it difficult for the articles to adhere to the member 13'. Also, as shown in FIG. 13, a return regulating member 13" may be formed into a column shape having a polygonal (e.g., triangular) cross section and may be rotated in a direction by a predetermined angle (120 degrees in case of having a triangular section).

Figure 7:
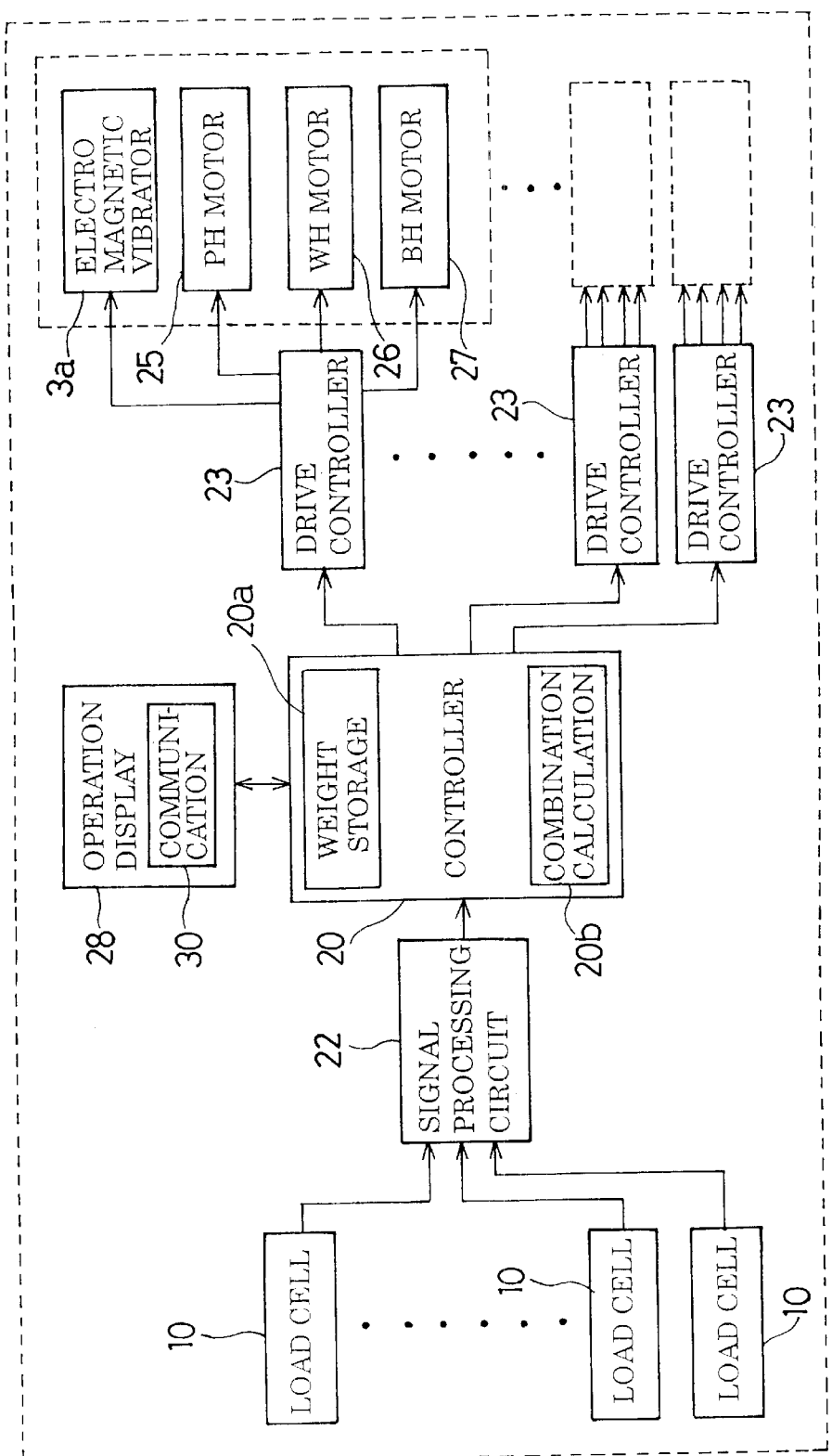
FIG. 7 is a schematic block diagram of a control system of the combination weighing apparatus according to the present invention.
Figure 8:
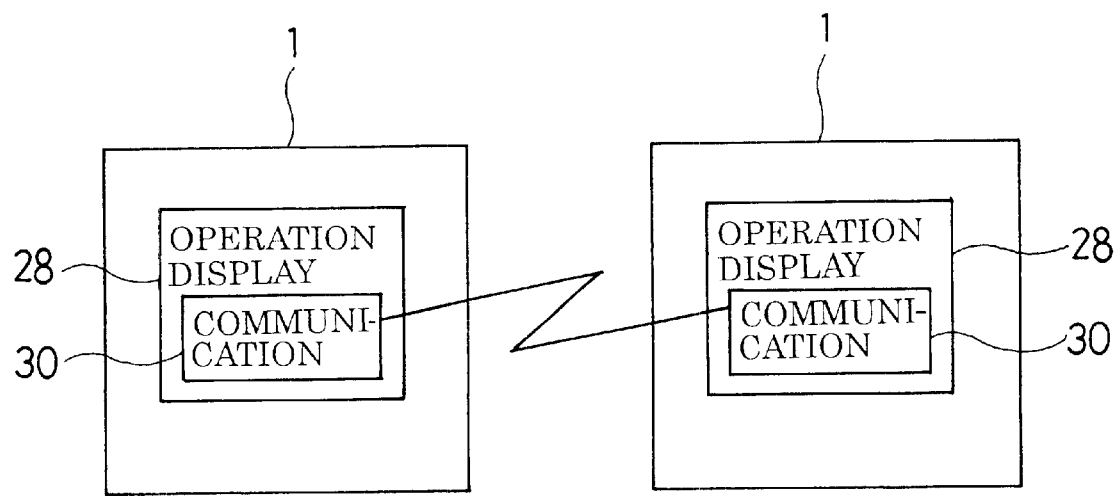
FIG. 8 is a schematic block diagram showing the relationship between the control system of the left-side apparatus and the control system of the right-side apparatus.

A controller controlling the respective operations of the combination weighing apparatus is included in the control box 9 shown in FIG. 1. FIG. 7 is a schematic block diagram of control systems for the controller. As shown, weight signals are inputted into the controller 20 through a signal processing circuit 22 from a plurality of load cells 10, respectively. In addition, drive control signals are outputted to the electromagnetic vibrators 3a of the corresponding supply feeders 3 (FIG. 1), PH (pool hopper) motors 25 for opening/closing the shutters 4b of the corresponding pool hoppers (PH) 4 (FIG. 1), WH (weighing hopper) motors 26 for opening/closing the shutters 5b of the corresponding weighing hoppers (WH) 5 (FIG. 1) and BH (booster hopper) motors 27 for opening/closing the shutters 6b of the corresponding booster hoppers (BH) 6 (FIG. 1), respectively. An operation display means 28 is provided with a start switch, a stop switch, various setting switches, a display screen and the like.

The controller 20 includes weight storage means 20a and combination calculating means 20b. The weight storage means 20a stores weight signals from a plurality of load cells 10. If the present apparatus is used by coupling the apparatus with another combination weighing apparatus, the weight storage means 20a of a main controller 20, to be described later, also stores weight signals of another combination weighing apparatus which signals are received through communication means 30, to be described later. The combination calculating means 20b calculates a combination calculation value by combining a plurality of weight signals stored in the weight storage means 20a, obtains a combination in which the combination calculation value falls within a predetermined combination tolerance, and transmits a signal to the drive controllers 23 corresponding to the hoppers in the selected combination so as to open/close these hoppers.

Further, the operation display means 28 is provided with communication means 30 for allowing the apparatus to communicate with another combination weighing apparatus. Communication methods by means of the communication means 30 involve an infrared communication method, a radio communication method, a cable connection communication method and the like. Any method may be adopted. In case of coupling two combination weighing apparatus as in the case of this embodiment, the operation display means 28 of the two combination weighing apparatuses 1 are connected to each other so as to establish communication between the apparatuses through their respective communication means 30. In this case, the controller of one combination weighing apparatus serves as a main controller and that of the other apparatus serves as a sub-controller. The sub-controller only provides weight signals to the main controller. The combination calculating means 20b of the main controller 20 controls the respective driving controllers 23 of both of the combination weighing apparatuses altogether. In other words, in case of coupling two combination weighing apparatus with each other, an operator presets one of the controllers to serve as a main controller and the other controller to serve as a sub-controller. When the combination weighing apparatus in this embodiment is used solely without coupling the apparatus with another apparatus, the communication means is not used.

Next, description will be given to the operation of this combination weighing apparatus. It is noted that control procedures are the same between a case where one combination weighing apparatus conducts a combination weighing operation solely and a case where a plurality of combination weighing apparatuses conduct one combination weighing operation as a whole.

An operator stands in back of each combination weighing apparatus shown in FIG. 3 and inputs the articles stored in the table 2 by eye measure into a plurality of outlets 2a. The inputted articles are supplied, by way of the inclined troughs 3b of the supply feeders 3 corresponding to the respective outlets 2a, to the pool hoppers 4 corresponding to the inclined troughs 3b. When no article is present in the weighing hopper 5 shown in FIG. 4 below the pool hopper 4, the shutter 4b of the pool hopper 4 opens to allow the articles in the hopper 4 to be discharged into the weighing hopper 5. The weight of the articles supplied to the weighing hopper 5 is detected by the load cell 10 and stored in the weight storage means 20a (FIG. 7) of the controller 20. If no article is present in the booster hopper 6 below the weighing hopper 5, the shutter 5b of the weighing hopper 5 opens after weight detection to allow the articles in the hopper 5 to be discharged into the booster hopper 6. When the weighing hopper 5 is emptied, articles are supplied from the pool hopper 4 into the weighing hopper 5. The weight of the articles are also detected by the load cell 10 and stored in the weight storage means 20a (FIG. 7) of the controller 20. That is, the controller 20 stores the weights of the articles in the booster hoppers 6 which are weighed previously and the weights of the articles in the weighing hoppers 5 which are weighed this time. This operation is carried out for each head constructed by the pool hopper 4, the weighing hopper 5 and the booster hopper 6 arranged below each outlet 2a. It is noted that the stored values are updated every time the weighing hopper 5 and the booster hopper 6 discharge and supply articles. In addition, if the controller 20 serves as a sub-controller, the stored values of the weights of the articles are updated and, at the same time, the updated weight values are transmitted to the main controller 20 of the other weighing apparatus through the communication means 30. The main controller 20 which has received the updated weight values, stores these values in the weight storage means 20a.

The combination calculating means 20b of the controller 20 selects a combination of hoppers so that the sum of the stored values is equal to or close to a preset target weight value. If one combination weighing apparatus is used solely, a combination of hoppers is selected from among the five weighing hoppers 5 and the five booster hoppers 6 arranged in horizontal rows so that the sum of the stored values falls within a combination predetermined combination tolerance, i.e., so that the sum is not less than a combination target value (lower limit value) and not more than an upper limit value which is slightly higher than the lower limit value. When two combination weighing apparatuses are used by coupling them with each other, the storage means 20a of the main controller 20 stores the weight values for all hoppers of the two combination weighing apparatuses. Thus, a combination of hoppers is selected from among ten weighing hoppers 5 and ten booster hoppers 6 arranged in horizontal rows so that the combined value falls within a combination predetermined combination tolerance. In these case, the number of stored values involved in the combination is not specially fixed. However, if a stored value for a weighing hopper 5 is included in the combination, it is required that the stored value for the booster hopper 6 below the weighing hopper 5 be involved in the combination. As can be seen, only the combination calculating means 20b of the main controller 20 conducts the combination calculating processing and the combination calculating means 20b of the sub-controller 20 does not conduct such a processing. When a combination selected, the shutters of the corresponding hoppers open to allow the articles in the hoppers to be discharged onto the conveyors 7. Here, the main controller 20 transmits signals not only to the drive controllers 23 of the hoppers 5 and 6 in the selected combination but also to the drive controllers 23 of the hoppers 5 and 6 in the selected combination of another combination weighing apparatus through the communication means 30. Consequently, the shutters of the corresponding hoppers of another apparatus open, as well. If the hoppers in the selected combination are all booster hoppers 6, articles are supplied from the weighing hoppers 5 to the booster hoppers 6 which become empty. If the combination includes a weighing hopper 5, the articles in the weighing hopper 5 are discharged together with the articles in the booster hopper 6 below this hopper 5. Thereafter, next supplied articles in the weighing hopper 5 are weighed and the articles are then supplied to the booster hopper 6.

The articles discharged onto the conveyors 7,7 shown in FIG. 2 are transported by the conveyors 7,7 to the collection position and dropped into the discharge chute 12. At this moment, one side edges of the return regulating plates 13,13 are in contact with the lower surfaces of the belts at the return sides of the conveyors 7,7, and the return regulating plates 13,13 scrap away the articles brought into the lower sides while adhering to the surfaces of the belts of the conveyors 7,7. Thereafter, the return regulating plates 13,13 rotate in a direction P toward the inside of the discharge chute 12 by a predetermined angle and shake off and drop the articles adhering to the plates themselves into the discharge chute 12.

In the first embodiment, two combination weighing apparatuses are disposed in a side-by-side fashion or aligned horizontally. Two combination weighing apparatuses may be arranged as described in the second to fourth embodiments shown in FIGS. 9 to 11.

Figure 9:
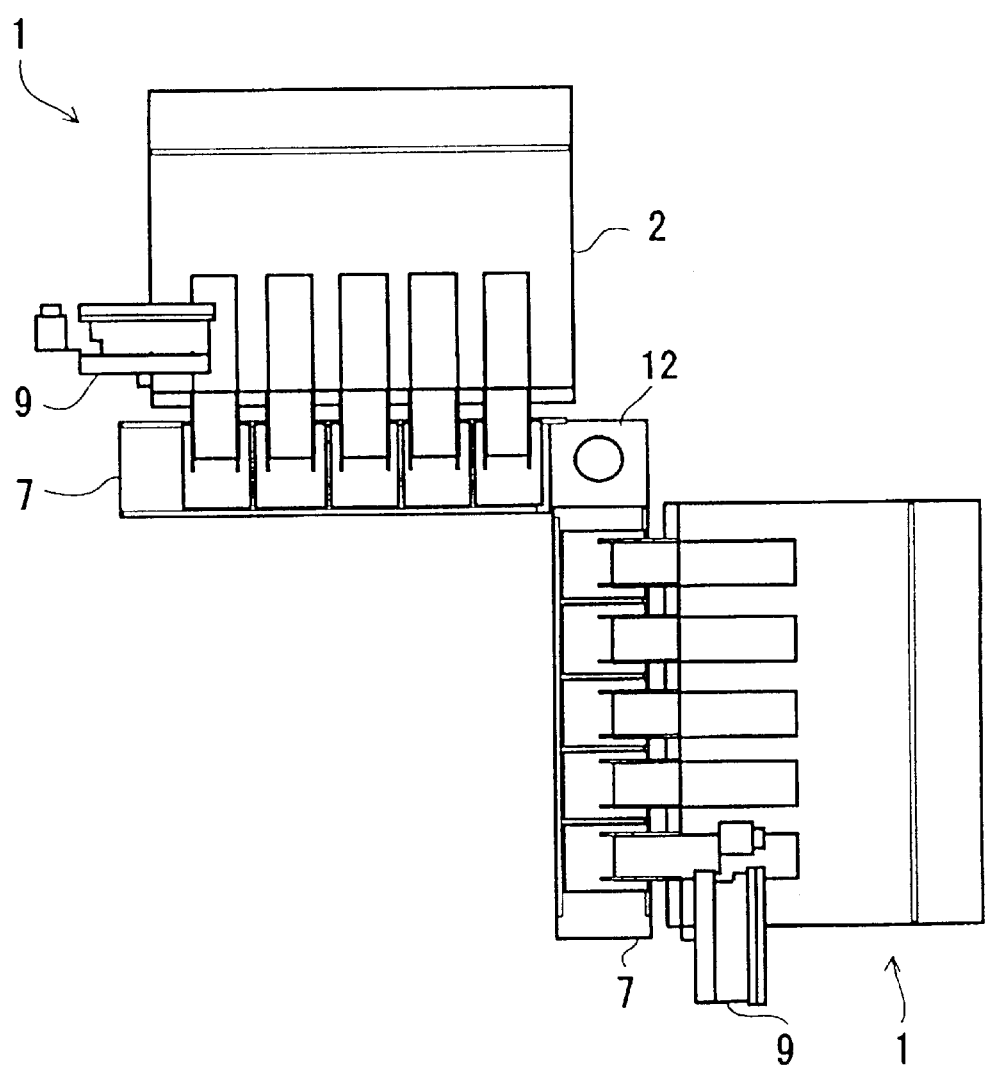
FIG. 9 is a plan view of the combination weighing apparatuses according to a second embodiment of the present invention.

In the second embodiment shown in FIG. 9, two combination weighing apparatuses are arranged so that the conveyors 7 of the respective apparatuses are placed at right angle with each other. In this arrangement as in the case of the arrangement in the first embodiment, one combination weighing apparatus 1 positioned above in FIG. 9 transports articles from the left end of the apparatus to the right end thereof by using the conveyor 7. The other combination weighing apparatus positioned right in FIG. 9 transports articles from the right end of the apparatus to the left end thereof by using the conveyor 7. In this way, the articles from the two combination weighing apparatuses 1 are transported to a collection position.

Figure 10:
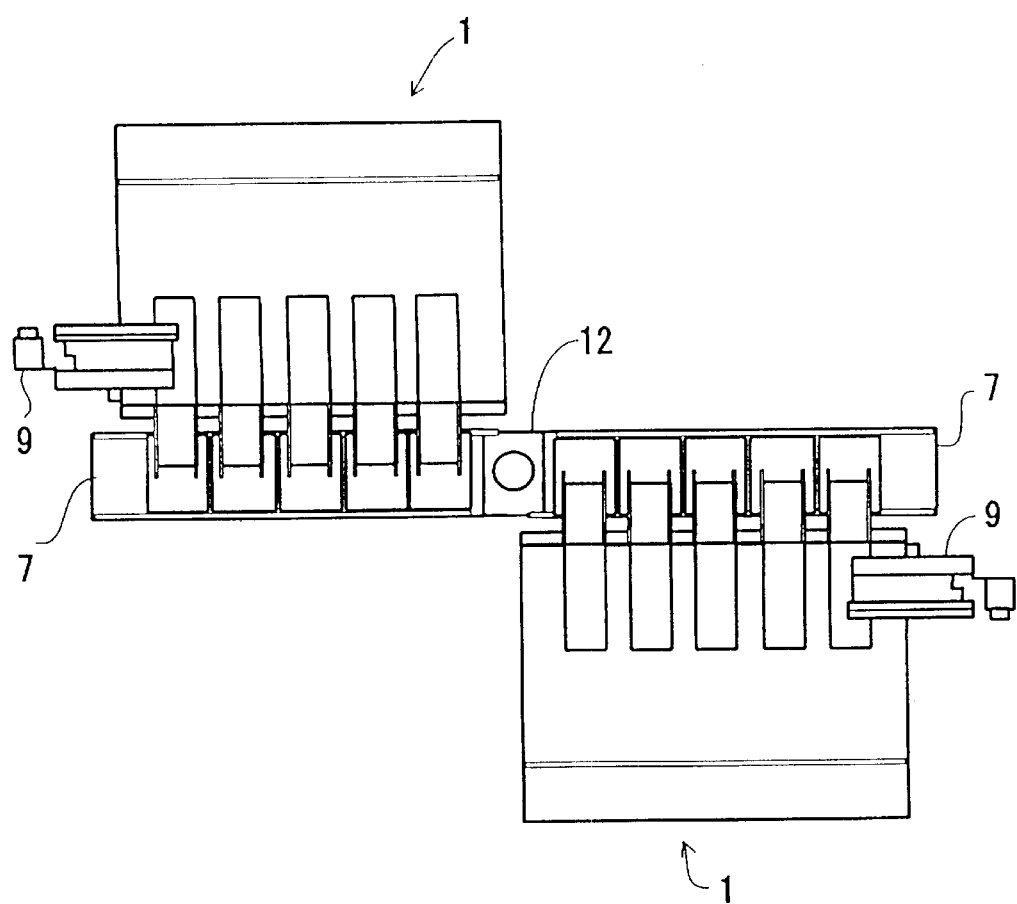
FIG. 10 is a plan view of the combination weighing apparatuses according to a third embodiment of the present invention.

Furthermore, in the third embodiment shown in FIG. 10, two combination weighing apparatuses are arranged to face directions opposite to each other so that the conveyors 7 of the respective apparatuses are arranged linearly. In this arrangement, the conveyors 7 of the two combination weighing apparatuses 1 transport articles in the same direction when viewed from the front side relative to the respective weighing apparatuses 1, e.g., from the left ends to right ends of the apparatuses 1, and convey the articles to a collection position in opposite direction.

Figure 11:
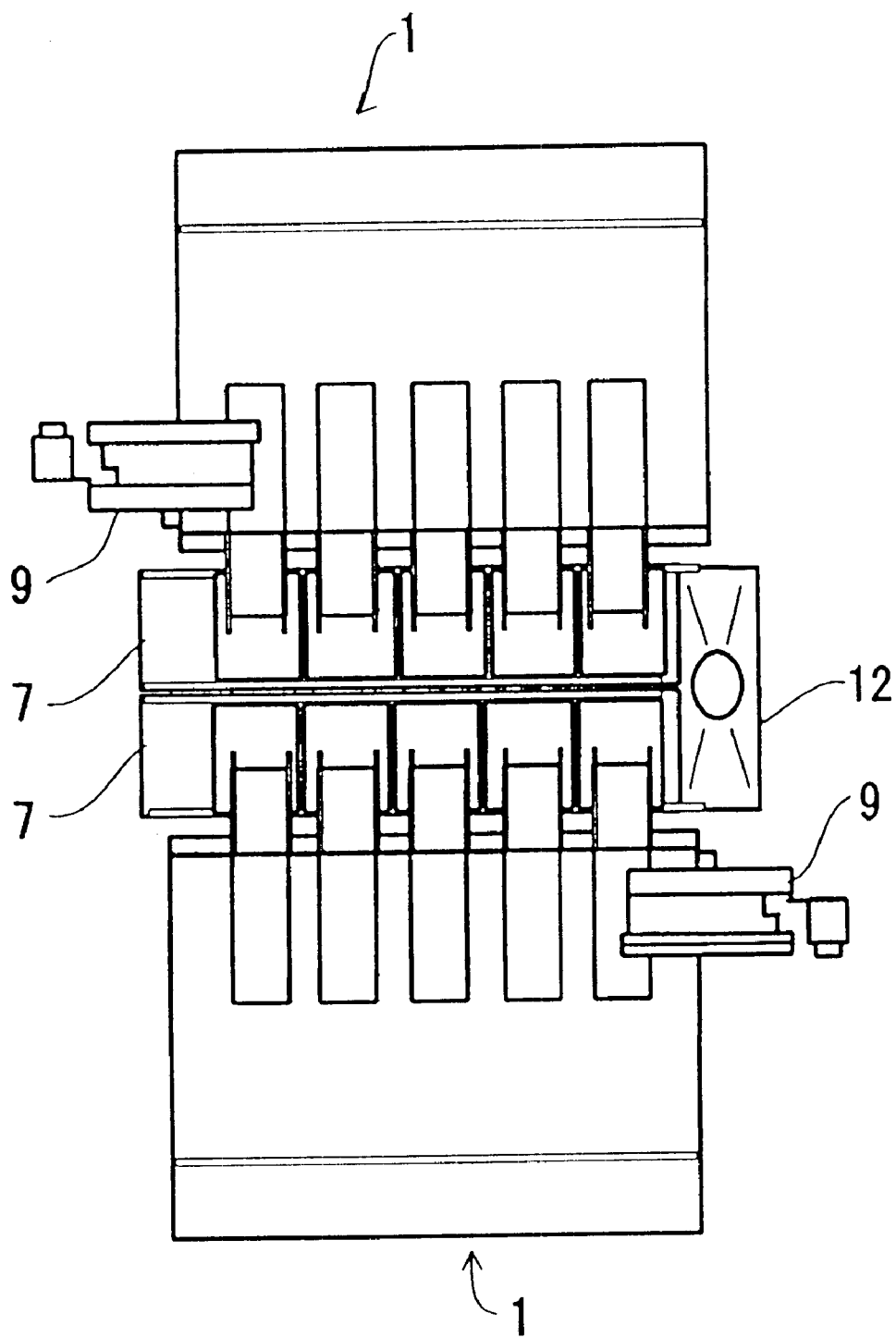
FIG. 11 is a plan view of the combination weighing apparatuses according to a fourth embodiment of to the present invention.

Moreover, in the fourth embodiment shown in FIG. 11, two combination weighing apparatuses are arranged so that the conveyors 7 of the respective apparatuses confront each other. In this arrangement, one combination weighing apparatus 1 transports articles from the left end of the apparatus to the right end thereof when viewed from the front side. The other combination weighing apparatus 1 transports articles from the right end to the left end of the apparatus when viewed from the front side. In this way, the articles from the two combination weighing apparatuses 1 are transported in parallel to a collection position and dropped into a discharge chute 12 from the same direction.

Since the direction in which the conveyor 7 transports the articles can be selected between a forward direction and a backward direction, the position at which the discharge chute 12 is attached can be changed and the position at which the control box 9 is attached can be changed, it is possible to select an appropriate arrangement to match a workshop.

Description has been given so far to the state in which two combination weighing apparatuses are coupled with each other. It is also possible to use three or more combination weighing apparatuses and to allow the apparatuses to conduct one combination weighing operation as a whole. In that case, the controller of any one of the combination weighing apparatuses may be used as a main controller and the controllers of all other combination weighing apparatuses may be used as sub-controllers.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are interpreted to fall within the scope of the invention as defined by the appended claims.

What is claimed is:

1. An apparatus having a plurality of combination weighing apparatuses, each comprising:
    a plurality of hoppers arranged in horizontal rows;
    a conveyor provided below the plurality of hoppers for transporting articles discharged from the plurality of hoppers, respectively, to a predetermined collection position; and
    a controller for controlling a combination weighing operation of the respective combination weighing apparatus, said combination weighing operation selecting a combination of hoppers so that a combination weight value obtained by combining some of weight values of the articles supplied to said plurality of hoppers falls within a predetermined combination tolerance, and discharging the articles from the hoppers in the selected combination; and wherein
    discharge ends of the conveyors of the plurality of combination weighing apparatuses are disposed to discharge the articles at the same predetermined collection position, and said controller of one of the plurality of combination weighing apparatuses controls the combination weighing operation of the plurality of combination weighing apparatuses in accordance with weight values obtained in all of the combination weighing apparatuses.

2. The apparatus as claimed in claim 1, wherein the conveyor is constructed to be able to select a transport direction between a forward transport direction and a backward transport direction.

3. The apparatus as claimed in claim 1, wherein a return regulating member for detaching the articles from the conveyor at said collection position, is provided to be associated with the conveyor.

4. The apparatus as claimed in claim 1, wherein the plurality of combination weighing apparatuses are disposed together in a side-by-side fashion.

5. The apparatus as claimed in claim 1, wherein the plurality of combination weighing apparatuses are disposed together to confront each other.

6. An apparatus comprising:
    a first combination weighing apparatus including:
        a plurality of hoppers;
        a conveyor provided below the plurality of hoppers for transporting articles discharged from the plurality of hoppers, respectively, to a predetermined collection position; and
        a controller controlling a combination weighing operation of said first combination weighing apparatus, said combination weighing operation selecting a combination of said plurality of hoppers so that a combination weight value obtained by combining weight values of the articles supplied to said combination of said plurality of hoppers falls within a predetermined combination tolerance, and discharging the articles from the hoppers in the selected combination; and
    a second combination weighing apparatus having a controller controlling a combination weighing operation of the second combination weighing apparatus, the second combination weighing apparatus discharging articles at the same predetermined collection position as the first combination weighing apparatus wherein the controller of said first combination weighing apparatus controls the combination weighing operation of said first combination weighing apparatus and said second combination weighing apparatus in accordance with weight values obtained in said first combination weighing apparatus and said second combination weighing apparatus.

7. An apparatus according to claim 6, wherein the controller of the first combination weighing apparatus controls the combination weighing operation of said first combination weighing apparatus and said second combination weighing apparatus so that the weight values obtained at the predetermined collection position fall within the predetermined combination tolerance.

8. An apparatus according to claim 6, wherein the conveyor is constructed to be able to select a transport direction between a forward transport direction and a backward transport direction.

9. An apparatus according to claim 6, wherein a return regulating member for detaching the articles from the conveyor at said collection position, is provided to be associated with the conveyor.

10. An apparatus according to claim 6, wherein the first combination weighing apparatus is disposed together with the second combination weighing apparatuses in a side-by-side fashion.

11. An apparatus according to claim 6, wherein the first combination weighing apparatus is disposed together with the second combination weighing apparatuses to confront each other.

12. An apparatus comprising:

a first and second combination weighing apparatus, each having a controller controlling a combination weighing operation of the respective combination weighing apparatus, said second combination weighing apparatus discharging articles to a predetermined collection position the same as a predetermined collection position for the first combination weighing apparatus, wherein, the controller of the first combination weighing apparatus controls the combination weighing operation of said first combination weighing apparatus and the combination weighing operation of said second combination weighing apparatus in accordance with weight values obtained in said first combination weighing apparatus and said second combination weighing apparatus.

13. An apparatus according to claim 12, wherein the first combination weighing apparatus is disposed together with the second combination weighing apparatuses in a side-by-side fashion.

14. An apparatus according to claim 12, wherein the first combination weighing apparatus is disposed together with the second combination weighing apparatuses to confront each other.

15. An apparatus according to claim 12, wherein the controller of the first combination weighing apparatus controls the combination weighing operation of said first combination weighing apparatus and said second combination weighing apparatus so that the weight values obtained at the predetermined collection position fall within a predetermined combination tolerance.

16. An apparatus comprising:

a plurality of combination weighing apparatuses, each of said plurality of combination weighing apparatuses comprising:

a plurality of hoppers;

a conveyor provided below the plurality of hoppers for transporting articles discharged from the plurality of hoppers, respectively, to a predetermined collection position;

a processor controlling a combination weighing operation selecting a combination of said plurality of hoppers so that a combination weight value obtained by combining weight values of the articles supplied to said combination of said plurality of hoppers falls within a predetermined combination tolerance, and discharging the articles from the hoppers in the selected combination, said plurality of combination weighing apparatuses discharging articles to the same predetermined collection position; and a controller of at least one of said plurality of combination weighing apparatuses controls the combination weighing operation of all of the plurality of combination weighing apparatuses in accordance with weight values obtained in all of said plurality of combination weighing apparatuses.

\* \* \* \* \*

UNITED STATES PATENT AND TRADEMARK OFFICE
CERTIFICATE OF CORRECTION

PATENT NO. : 6,437,256 B1
DATED : August 20, 2002
INVENTOR(S) : Hisakazu Miyamoto It is certified that error appears in the above-identified patent and that said Letters Patent is hereby corrected as shown below:

Column 1,
Line 59, change "2 g to 6 g" to -- 2g to 6g --.
Line 61, change "2 g" to -- 2g --.

Column 7,
Line 55, change "these" to -- this --.

Signed and Sealed this

Seventh Day of January, 2003

JAMES E. ROGAN
*Director of the United States Patent and Trademark Office*